Oct. 15, 1929.  P. AMBORY  1,731,995
ELECTRIC WATER HEATER
Filed Nov. 12, 1928
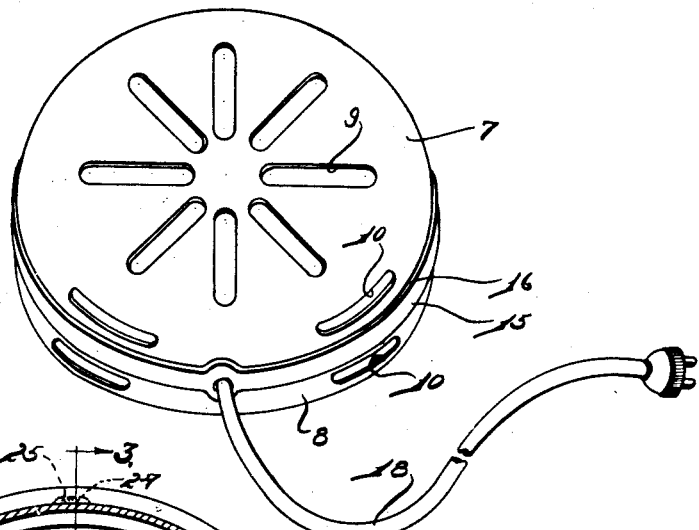
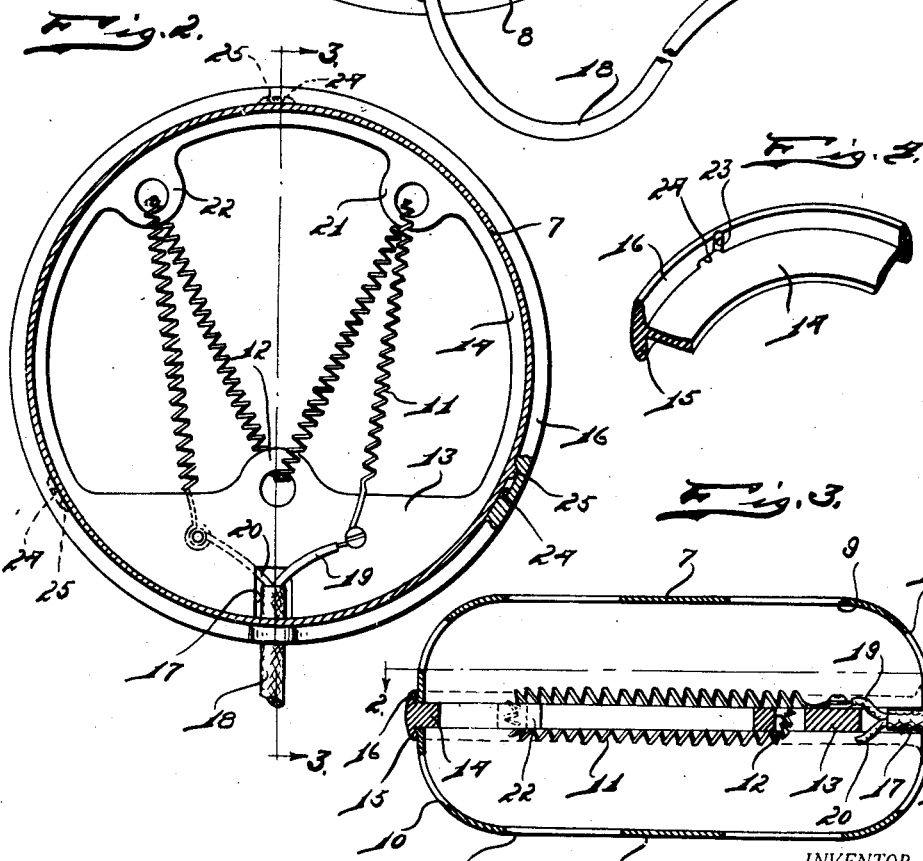
INVENTOR.
Paul Ambory.
BY
Thos S Donnell
ATTORNEY.

Patented Oct. 15, 1929

1,731,995

UNITED STATES PATENT OFFICE

PAUL AMBORY, OF HAZEL PARK, MICHIGAN

ELECTRIC WATER HEATER

Application filed November 12, 1928. Serial No. 318,741.

My invention relates to a new and useful improvement in an electric water heater and has for its object the provision of a device of this class which will be simple in structure, economical of manufacture and highly efficient in use.

Another object of the invention is the provision in an electric water heater of this class, of a sectional casing engaging an insulating heating element supporting member.

Another object of the invention is the provision of an electric water heater having an insulating heating element supporting member provided with flanges for engaging and retaining in position the sections of an inclosing housing.

Other objects will appear hereinafter.

The invention consists in the combination and arrangement of parts hereinafter described and claimed.

The invention will be best understood from a reference to the accompanying drawings which form a part of this specification and in which, Fig. 1 is a perspective view of the invention.

Fig. 2 is a sectional view taken on line 2—2 of Fig. 3.

Fig. 3 is a sectional view taken on line 3—3 of Fig. 2.

Fig. 4 is a fragmentary perspective view of an insulating member used in the invention.

The device comprises a housing formed from a pair of sections 7 and 8, each of which is provided with a plurality of slots 9 and 10. For heating purposes a heating element 11 in the nature of a resistance coil is projected through an eyelet 12 formed on the reinforcing portion 13 of the insulating ring 14, which is formed T-shaped in close section as shown in Fig. 4, to provide the downwardly projecting flange 15 and the upwardly projecting flange 16. A recess 17 is formed in this insulating material to accommodate a cable 18 in which are carried the wires 19 and 20, which are attached to the opposite ends of the heating coil 11, this heating coil being projected through the eyelets 21 and 22 formed on the insulating ring 14. An axially extending groove 23 is formed in the flange 16 and likewise in the flange 15, this groove communicating with a circumferentially extending groove 24 to provide a bayonet slot for the reception of the boss 25 which projects outwardly from the periphery of the housing sections 7 and 8.

In assembly these sections are engaged with the inner surface of the flanges 16 and 17, the boss engaging in the bayonet slot and serving to bind these sections on the ring. In the form shown 3 of these bayonet slots are provided although the number may be optional.

An electric water heater constructed in this manner is one which is light, durable, easily and quickly assembled and one which provides ample protection for the heating element.

While I have illustrated and described the prefered form of my invention I do not wish to limit myself to the precise details of structure shown but desire to avail myself of such variations and modifications as come within the scope of the appended claims.

Having thus described my invention what I claim as new and desire to secure by Letters Patent is:

1. An electric water heater of the class described comprising: an insulating member; a heating coil supported by said insulating member; and a housing, comprising a pair of sections, mounted on said insulating member and inclosing said coil; and flanges on said insulating member engaging the periphery of each of said housing sections.

2. An electric water heater of the class described comprising: an insulating member; a heating coil supported by said insulating member; and a housing, comprising a pair of sections, mounted on said insulating member and inclosing said coil, said flanges having bayonet slots formed therein; and a boss on the periphery of each of said housing sections for engaging in said bayonet slots.

In testimony whereof I have signed the foregoing specification.

PAUL AMBORY.